No. 897,943. PATENTED SEPT. 8, 1908.
F. A. WARREN.
CENTRIFUGAL OILING BEARING FOR WHEELS.
APPLICATION FILED JAN. 2, 1907.
2 SHEETS—SHEET 2.
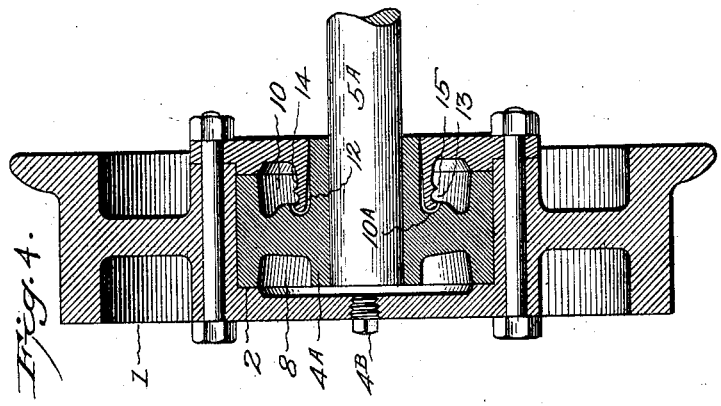
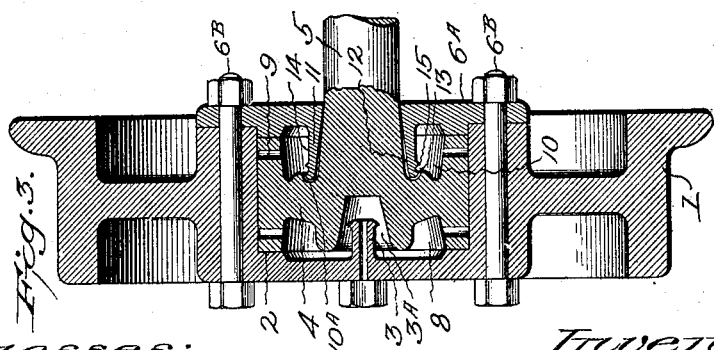
Witnesses:
G. Sargent Elliott,
Adella M. Fowle
Inventor:
By Frederic A. Warren.
H. S. Bailey Attorney

UNITED STATES PATENT OFFICE.

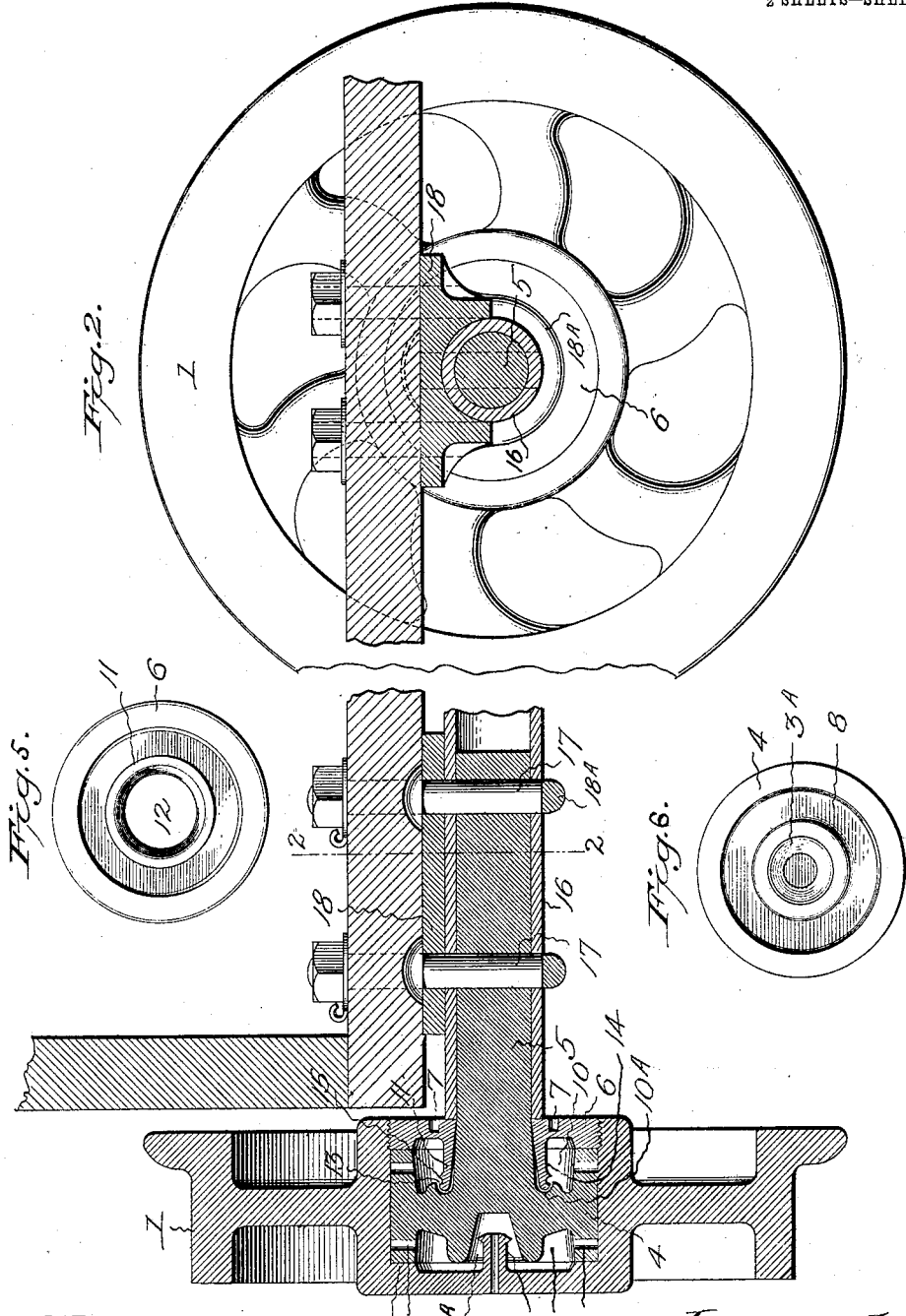

FREDERIC A. WARREN, OF CANON CITY, COLORADO.

CENTRIFUGAL-OILING BEARING FOR WHEELS.

No. 897,943.  Specification of Letters Patent.  Patented Sept. 8, 1908.

Application filed January 2, 1907. Serial No. 350,452.

*To all whom it may concern:*

Be it known that I, FREDERIC A. WARREN, a citizen of the United States of America, residing at Canon City, county of Fremont, and State of Colorado, have invented a new and useful Centrifugal-Oiling Bearing for Wheels, of which the following is a specification.

My invention relates to improvements in centrifugal oiling bearings, for wheels, and the objects of my invention are: first, to construct a bearing for wheels in which the centrifugal action of the oil while the wheel is in motion will tend to assist the distribution of the oil at the points to be lubricated. Second, to construct a bearing for wheels having a space for a quantity of oil so that the wheel can run for several weeks without being oiled. Third, to construct a bearing for wheels provided with oil grooves so arranged that all oil may be returned to the space provided for it whether the wheel is in motion or still. Fourth, to construct a bearing for car wheels provided with an oil guard that will prevent the escape of the oil, in case the wheel is turned on its side. Fifth, to construct a bearing that will be practically dust proof. Sixth, to provide a bearing that is free from projections beyond the wheel flange to which it is applied. I attain these objects by the mechanism illustrated in the accompanying drawings, in which:

Figure 1, is a vertical section through the center of a car wheel and an axle embodying my centrifugal oiling bearing, showing the same secured to the axle of a car. Fig. 2, is a sectional view on the line 2—2 of Fig. 1. Fig. 3, is a sectional view of a wheel similar to that shown in Fig. 1, but having the cap bolted thereto. Fig. 4, is a sectional view showing a removable bearing disk applied to an axle of the usual construction. Fig. 5, is an inner face view of the wheel-hub cap. And Fig. 6, is an outer face view of the disk bearing.

Similar letters of reference refer to similar parts throughout the several views.

Referring to the drawings, the numeral 1, designates a car wheel, which is provided with a large axial recess 2, which extends nearly but not quite through the wheel, and is not visible from the outside face of the wheel. A teat or projection 3, extends centrally from the center of the closed side of this recess, through which a small oil entrance aperture is formed, which permits oil to be supplied to the recess 2 from the outside of the wheel, a central well $3^A$ being formed in the disk, into which the teat 3 projects, as clearly shown in Figs. 1 and 3. The axial recess 2 of the car wheel is made considerably larger in diameter than is required for the commonly used axles, and in it I fit a disk 4, which I term a disk bearing. This disk bearing 4, is preferably formed integrally on the end of an axle 5, but if desired it may be made separate from the axle and be secured to the end of the axle in any suitable manner. I preferably make this disk of much larger diameter than the diameter of the axle, and the recess in the car wheel is made to fit snugly but rotatably on the rim of the disk.

The entrance to the recess in the wheel is closed by a cap 6, which may be secured to the hub of the car wheel in any suitable manner, such as by being secured to the end of the hub by bolts or screws, but in Fig. 1, in which the preferred construction of my wheel is shown, I have illustrated this cap screwed into the entrance to the recess, which is interiorly threaded to receive it; and in order to enable this threaded cap to be screwed into and out of the recess I provide it with means for receiving a wrench such as apertures 7, to which a spanner or other suitable wrench may be applied. The disk bearing is fitted snugly between the inside face of the cap and the closed side of the chamber, so that there is no play between the parts. The outer face of the disk is provided with an annular recess 8, which is concentric with the axle and extends deep enough into the side of the disk to form an oil recess or reservoir of sufficient capacity for the size of the disk and wheel used, and apertures 9 extend from this recess through the rim of the disk. A similar recess 10, is formed in the inner face of the disk, but is preferably deeper than the recess 8, and the cap 6 is provided with a hub portion 11, which extends from the inner face of the cap into the recess 10. This hub is provided with an axial bore 12, that fits loosely over the axle, and is slightly flared from the cap to the outer end of the hub; to permit any oil that collects between the axle and the hub of the cap to run into the oil recess of the disk instead of running or working out to the outer face of the cap. The hub of the cap is made thin so that it does not take up much room in the oil recess of the disk, and in its outer surface two annular recesses 13 and 14 are formed. The recess 13 is formed adjacent to the outer end of the hub, and is a semi-circular recess that extends annularly around the hub of the cap. The recess 14 extends annularly around the hub, and is formed by a projecting annular lip 15, that is formed on the hub adjacent to its end. This lip 15, separates the recess 13, from the recess 14. The recess 14 extends from this lip 15, to the inside surface of the cap, and the recesses 13 and 14, of the hub 11, together with the recess 10, in the adjacent side of the disk form an oil recess or reservoir within the disk and cap.

In addition to the annular grooves around the hub, I form an annular channel 10^A, in the bottom of the recess 10, into which the end of the hub 11 extends, and the lip of this channel together with the annular groove 13 in the hub, and its flared bore 12, will prevent any oil from working out between the axle and cap.

In Fig. 1, I illustrate my improved centrifugal oiling bearing applied to a car wheel having a stub axle, which is secured to a fragment of a car. My disk bearing can be made independent of the axle, and applied to either square or round axles that are at present in use, but this construction does not allow for as large an oil recess in the disk and wheel, as the disk has to be provided with a larger hub portion to allow stock enough to key the disk securely to the axle, but when the hub has only to be the size of the axle an oil recess of much greater diameter can be made in the disk.

In Fig. 1, I illustrate the application of a stub axle to a car. A piece of pipe 16, is provided, of a length equal to the distance desired between the wheels, and the free ends of the axles are secured tightly in the ends of the pipe by pins 17, which secure the pipe and the stub shaft and a saddle 18 together, and the saddle and pipe are secured to the car body by U bolts 17.

In Fig. 3, I have shown a wheel similar in construction to the wheel shown in Fig. 1, only I employ a cap 6^A, which is bolted to the hub of the wheel by bolts 6^B.

In Fig. 4, a construction is illustrated, in which an axle 5^A, as commonly used, is employed, and a removable bearing disk 4^A is employed, which is suitably secured upon the end of the axle. Either form of cap may be employed, and I have shown an oil opening in the outer face of the wheel, which is closed by a screw plug 4^B.

The operation is as follows: The oil recess or reservoir having been provided with sufficient oil, and the wheel rotating on the disk bearing, the oil is instantly carried around the disk by the wheel, and the wheel being under the ordinary speed at which mine cars are run, will, owing to the large diameter of the recess, create sufficient centrifugal force to instantly throw the oil around the rim of the disk; some of it will flow through the radial holes through the rim of the disk, and this centrifugal action will keep the oil constantly traveling over the rim and between it and the inner wall of the recess of the wheel, and showering down between its sides and the inside of the cap onto the fixed hub of the cap into the annular recesses thereof around which it flows and drops into the oil recess or reservoir at the lower side of the disk bearing; also any oil that runs onto the center web will collect on the overhanging channel lips and will drop into the small groove in the end of the hub of the cap and flow into the oil recess at the lower portion of the disk, but should any oil splash or run or work into the tapering groove between the hub of the cap and the hub of the disk it will run inward to the oil recess instead of outward. The construction is also such that should the wheel and its axle be turned on its side, the oil will not run out between the hub of the disk and the hub of the cap, or through the oil aperture in the teat 3.

A car wheel and its axle in order to run well require frequent oiling, and it is necessary when the bearings and wheels are constructed as shown in Fig. 4, to remove the oil aperture plug whenever oil has to be inserted in the bearing recess, and there is always danger of losing these plugs, as they are apt to wear loose in time and work out of their threaded apertures and get lost. Consequently when the car wheels and axles are constructed for one another, I preferably arrange the oil inlet aperture as shown in Figs. 1 and 3, in which the end of the bearing disk is provided with the recess or well 3^A, the sides of which converge from the entrance of the recess to a small bottom portion, and the bottom of the recess in the wheel is provided with the apertured teat 3, through the axial center of which an oil inlet aperture is formed, through which suitable oil can at any time be supplied to the interior of the wheel. This aperture is always open and its position and arrangement, together with the inclined sides of the recess in the bearing, make it impossible for the oil to run out or escape from the car wheel recess when the car is turned over on its side.

Having described my invention, what I claim as new and desire to secure by Letters Patent is:

1. In a centrifugal oiling bearing for car wheels, a car axle, a bearing disk integrally connected to said car axle, provided with a deep annular recess in its side next to said axle, a car wheel having an axial recess in which said bearing disk fits, a cap provided with a hub having annular grooves and having an axial bore tapering divergingly from said cap to the end of said hub, said hub being arranged to fit loosely over the axle of said bearing disk, means for securing said cap to said car wheel, and a projection on said disk surrounding and overhanging the adjacent annular grooves of said cap's hub.

2. In a centrifugal oiling bearing for car wheels, the combination with a car wheel, provided with a recess at its axial center adapted to receive an axle bearing, of a car axle, a bearing disk connected to said car axle and fitting in said car-wheel's axial recess, said bearing disk being provided with a recess at its axial center extending into it a predetermined distance from its side opposite to its axle, a lug at the axial center of the bottom wall of the recess of said wheel, extending into the recess of said bearing disk and provided with an oil inlet aperture extending through it from the outside of said wheel, an oil holding recess in the axle side of said bearing disk, and a cap secured to said car wheel to close the entrance to said recess, provided with an inwardly projecting hub at its center, extending into the recess of said bearing disk, there being a rim portion on said disk, provided with radial apertures, said rim portion being arranged to surround the hub of said cap.

3. In a centrifugal oiling bearing for car wheels, the combination with the car wheel axle, having an enlarged disk bearing at its end, said disk being provided with recesses in its sides, and with an oil receiving recess at its axial center, of a car wheel provided with an axial recess extending partially through it, arranged to fit rotatably on said disk bearing, an inwardly projecting lug on the bottom wall of the recess of said wheel adapted to extend into said oil inlet recess of said disk bearing, said lug having an oil inlet aperture extending through it arranged to discharge oil into the oil inlet recess of said disk bearing, and a cap adapted to be secured to said wheel and arranged to fit around said axle and close the entrance to said recess and confine said disk bearing rotatably in said car wheel's recess.

4. In a centrifugal oiling car wheel, the combination with the car wheel, having an axial recess extending partially through it from its axle receiving side, and an introverted lug at the axial center of the bottom of said recess, containing an open oil inlet aperture, extending from the outside of the wheel through said lug, of the axle and disk bearing fitting rotatably in said car wheel's recess, said disk bearing being provided with an axial recess extending into its end adapted to fit loosely over said car wheel's introverted oil inlet lug, and the cap secured to said car wheel and arranged to confine said disk in said wheel's axial recess.

5. In a centrifugal oiling car wheel, the combination of an axle or shaft and a car wheel, provided with an axial aperture, with a disk bearing on said axle or shaft provided with a tapering hub portion fitting said wheel's axle aperture, oil recesses in the opposite side of said disk bearing the inner wall of which is provided with a circular annular projecting lip, a cap fitting over said axle and removably secured to the side of said car wheel, having a hub portion provided with a tapering bore fitting rotatably on said disk bearing's tapering hub and extending into its oil recess, and a projecting annular lip on the inner end of said cap's hub below the circular lip on the wall of said disk bearing's oil recess.

In testimony whereof I affix my signature in presence of two witnesses.

FREDERIC A. WARREN.

Witnesses:
GUY W. HARDY,
T. J. SCHAD.